US008346537B2

(12) United States Patent
Chino et al.

(10) Patent No.: US 8,346,537 B2
(45) Date of Patent: Jan. 1, 2013

(54) INPUT APPARATUS, INPUT METHOD AND INPUT PROGRAM

(75) Inventors: Tetsuro Chino, Kanagawa-ken (JP); Satoshi Kamatani, Kanagawa-ken (JP); Kazuo Sumita, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1381 days.

(21) Appl. No.: 11/528,558

(22) Filed: Sep. 28, 2006

(65) Prior Publication Data
US 2007/0124131 A1    May 31, 2007

(30) Foreign Application Priority Data
Sep. 29, 2005  (JP) ................................. 2005-284282

(51) Int. Cl.
*G06F 17/28*   (2006.01)
(52) U.S. Cl. ................ 704/3; 709/232; 709/231; 704/9; 704/277; 704/257; 704/235; 704/2; 701/533; 701/451; 701/431; 701/420; 455/513; 455/457; 455/456.1; 345/204; 340/686.1; 246/5
(58) Field of Classification Search .............. 704/9, 277, 704/257, 235, 2; 709/232, 231; 701/533, 701/451, 431, 420; 455/513, 457, 456.1; 345/204; 340/686.1; 246/5
See application file for complete search history.

(56) References Cited

U.S. PATENT DOCUMENTS

| | | | | |
|---|---|---|---|---|
| 5,129,605 A | * | 7/1992 | Burns et al. | 246/5 |
| 5,170,349 A | * | 12/1992 | Yagisawa et al. | 704/9 |
| 5,799,273 A | * | 8/1998 | Mitchell et al. | 704/235 |
| 6,047,327 A | * | 4/2000 | Tso et al. | 709/232 |
| 6,169,498 B1 | * | 1/2001 | King et al. | 340/686.1 |
| 6,385,586 B1 | * | 5/2002 | Dietz | 704/277 |
| 7,092,943 B2 | * | 8/2006 | Roese et al. | 1/1 |
| 2001/0053699 A1 | * | 12/2001 | McCrady et al. | 455/513 |

(Continued)

FOREIGN PATENT DOCUMENTS

JP       2000-200275      7/2000

(Continued)

OTHER PUBLICATIONS

Notification of Reason for Refusal issued by the Japanese Patent Office on Dec. 22, 2009, for Japanese Patent Application No. 2005-284282, and English-language translation thereof.

(Continued)

*Primary Examiner* — Michael Colucci
(74) *Attorney, Agent, or Firm* — Finnegan, Henderson, Farabow, Garrett & Dunner, L.L.P.

(57) ABSTRACT

An input apparatus which presents examples suitable to users, including an example storage module to store a plurality of example expressions; an edit storage module to store edits when a user edits the plurality of example expressions; a presentation example determining module to determine one or more presentation examples to be presented to the user from the plurality of example expressions stored in the example storage module; an edit adapting module to edit the presentation examples determined by the presentation example determining module based on the edits stored in the edit storage module; a display control module to present the presentation examples determined by the presentation example determining module to the user; and an entry accepting module to accept one of the presentation examples as a selected example when one of the presentation examples is selected by the user, or to receive edits from the user to one of the presentation examples and accept the edited presentation example as the selected example.

27 Claims, 13 Drawing Sheets

U.S. PATENT DOCUMENTS

| | | | |
|---|---|---|---|
| 2002/0116194 A1* | 8/2002 | Lewis et al. | 704/257 |
| 2003/0050075 A1* | 3/2003 | Rangarajan et al. | 455/456 |
| 2003/0065805 A1* | 4/2003 | Barnes, Jr. | 709/231 |
| 2003/0069690 A1* | 4/2003 | Correia et al. | 701/211 |
| 2003/0083806 A1* | 5/2003 | Odinak et al. | 701/202 |
| 2003/0097250 A1 | 5/2003 | Chino | |
| 2003/0149557 A1* | 8/2003 | Cox et al. | 704/2 |
| 2003/0164822 A1* | 9/2003 | Okada | 345/204 |
| 2003/0216912 A1 | 11/2003 | Chino | |
| 2004/0243392 A1 | 12/2004 | Chino et al. | |
| 2006/0074547 A1* | 4/2006 | Kaufman et al. | 701/200 |
| 2006/0270421 A1* | 11/2006 | Phillips et al. | 455/457 |
| 2008/0133124 A1* | 6/2008 | Sarkeshik | 701/201 |

FOREIGN PATENT DOCUMENTS

| | | |
|---|---|---|
| JP | 2002-125047 | 4/2002 |
| JP | 2002-366543 | 12/2002 |
| JP | 2003-58539 | 2/2003 |
| JP | 2004-118720 | 4/2004 |
| JP | 2004-220266 | 8/2004 |
| JP | 2005-141759 | 6/2005 |

OTHER PUBLICATIONS

Hirakawa, et al., "Apparatus, Method, and Computer Program Product for Speech Recognition Allowing for Recognition of Character String in Speech Unit", U.S. Appl. No. 11/374,976, filed Mar. 15, 2006.

Kamatani, et al., "Communication Support Apparatus and Computer Program Product for Supporting Communication by Performing Translation Between Languages", U.S. Appl. No. 11/370,105, filed Mar. 8, 2006.

Chino, et al., "Apparatus, Method, and Computer Program Product for Supporting Communication through Translation Between Languages", U.S. Appl. No. 11/368,406, filed Mar. 7, 2006.

Kamatani, et al., "Communication Support Apparatus and Computer Program Product for Supporting Communication by Performing Translation Between Languages", U.S. Appl. No. 11/368,618, filed Mar. 7, 2006.

Chino, et al., "Communication Support Apparatus and Computer Program Product for Supporting Communication by Performing Translation Between Languages", U.S. Appl. No. 11/372,030, filed Mar. 10, 2006.

* cited by examiner

| EXAMPLE ID | JAPANESE EXPRESSION | ENGLISH EXPRESSION | SITUATION |
|---|---|---|---|
| ... | ... | ... | ... |
| p01 | ニューヨーク#CITY | New York#CITY | - |
| p02 | ロサンゼルス#CITY | Los Angeles#CITY | - |
| p03 | シカゴ#CITY | Chicago#CITY | - |
| p04 | 東京#CITY | Tokyo#CITY | - |
| p05 | パリ#CITY | Paris#CITY | - |
| ... | ... | ... | ... |
| p06 | 叔父#PERSON | uncle#PERSON | - |
| ... | ... | ... | ... |
| p07 | エンパイアステートビル#POI | Empire State Building#POI | - |
| p08 | シアーズタワー#POI | Sears Tower#POI | - |
| p09 | チャイニーズシアター#POI | Chinese Theater#POI | - |
| p10 | ハリウッド#POI | Hollywood#POI | - |
| p11 | 凱旋門#POI | Arch of Triumph#POI | - |
| p12 | ロサンゼルス空港#AIRPORT | LAX#AIRPORT | - |
| p13 | オヘア空港#AIRPORT | O'hare Airport#AIRPORT | - |
| p14 | シャルルドゴール空港#AIRPORT | Charles de Gaulle Airport#AIRPORT | - |
| q01 | [ニューヨーク#CITY]へ行きます | I'll go to [New York#CITY]. | TRANSPORT |
| q02 | [シカゴ#CITY]には何時に着きますか | What time does it arrive at [Chicago#CITY]? | TRANSPORT |
| q03 | [シャルルドゴール空港#AIRPORT]行きのシャトルはいくらですか | How much is the shuttle for the [Charles de Gaulle Airport#AIRPORT]? | TRANSPORT |
| q04 | [ロサンゼルス空港#AIRPORT]へ行きたい | I'd like to go [LAX#AIRPORT] | TRANSPORT |
| ... | ... | ... | ... |
| q05 | 私の[叔父#PERSON]は[ニューヨーク#CITY]に住んでいる | My [uncle#PERSON] lives in [New York#CITY]. | FAMILY |
| q06 | [エンパイアステートビル#POI]はどこですか | Where is the [Empire State Building#POI]? | SIGHTSEEING |
| q07 | [ハリウッド#POI]を見てみたいです | I'd like to see [Hollywood#POI]. | SIGHTSEEING |
| ... | ... | ... | ... |

| EDIT ID | SOURCE EXAMPLE ID | SUBJECT EXPRESSION | EDITED RESULT EXPRESSION | SEMANTIC CLASS |
|---|---|---|---|---|
| .. | .. | .. | .. | .. |
| r01 | q01 | ニューヨーク(New York) | ロサンゼルス(Los Angeles) | #CITY |
| .. | .. | .. | .. | .. |
| r02 | q07 | ハリウッド(HOLLYWOOD) | 凱旋門(ARCH OF TRIUMPH) | #POI |
| .. | .. | .. | .. | .. |

(a1) ニューヨークへ行きます(I'LL GO TO NEW YORK.)
(a2) シカゴには何時に着きますか(WHAT TIME DOES IT ARRIVE AT CHICAGO?)
(a3) シャルルドゴール空港行きのシャトルはいくらですか(HOW MUCH IS THE SHUTTLE TO CHARLES DE GAULLE AIRPORT?)
(a4) ロサンゼルス空港へ行きたい(I'D LIKE TO GO TO LOS ANGELES AIRPORT.)

(b1) RECOGNITION RESULT=ロサンゼルスに行きます(I'LL GO TO LOS ANGELES )
    SOURCE EXAMPLE ID=q01
    EDITS=ニューヨーク/ロサンゼルス(NEW YORK/LOS ANGELES)

(c1) SUBJECT EXPRESSION=ニューヨーク(NEW YORK)
    EDITED RESULT EXPRESSION=ロサンゼルス(LOS ANGELES)
    SEMANTIC CLASS=#CITY (d1) I'll go to Los Angeles.

(e1) ロサンゼルスへ行きます(I'LL GO TO LOS ANGELES.)
(e2) ロサンゼルスには何時に着きますか(WHAT TIME DOES IT ARRIVE AT LOS ANGELES?)
(e3) シャルルドゴール空港行きのシャトルはいくらですか(HOW MUCH IS THE SHUTTLE TO CHARLES DE GAULLE AIRPORT?)
(e4) ロサンゼルス空港へ行きたい(I'D LIKE TO GO TO LOS ANGELES AIRPORT.)

(f1) What time does it arrive at Los Angeles?

| KNOWLEDGE ID | CONCEPTUAL EXPRESSION 1 | CONCEPTUAL EXPRESSION 2 | RELATION |
|---|---|---|---|
| .. | .. | .. | .. |
| s01 | ニューヨーク#CITY | エンパイアステートビル#POI | %MAIN SIGHTSEEING SPOT |
| s02 | シカゴ#CITY | シアーズタワー#POI | %MAIN SIGHTSEEING SPOT |
| s03 | パリ#CITY | 凱旋門#POI | %MAIN SIGHTSEEING SPOT |
| s04 | ロサンゼルス#CITY | チャイニーズシアター#POI | %MAIN SIGHTSEEING SPOT |
| s05 | ロサンゼルス#CITY | ユニバーサルスタジオ#POI | %MAIN SIGHTSEEING SPOT |
| s06 | ロサンゼルス#CITY | ハリウッド#POI | %MAIN SIGHTSEEING SPOT |
| s07 | 東京#CITY | 浅草寺#POI | %MAIN SIGHTSEEING SPOT |
| .. | .. | .. | .. |
| s08 | パリ#CITY | シャルルドゴール空港#AIRPORT | %MAIN INTERNATIONAL AIRPORT |
| s09 | 東京#CITY | 成田空港#AIRPORT | %MAIN INTERNATIONAL AIRPORT |
| .. | .. | .. | .. |

(a1) ニューヨークへ行きます(I'LL GO TO NEW YORK.)
(a2) シカゴには何時に着きますか(WHAT TIME DOES IT ARRIVE AT CHICAGO?)
(a3) シャルルドゴール空港行きのシャトルはいくらですか(HOW MUCH IS THE SHUTTLE TO CHARLES DE GAULLE AIRPORT?)
(a4) ロサンゼルス空港へ行きたい(I'D LIKE TO GO TO LOS ANGELES AIRPORT.)

(b1) RECOGNITION RESULT=ロサンゼルスに行きます(I'LL GO TO LOS ANGELES)
    SOURCE EXAMPLE ID=q01
    EDITS=ニューヨーク/ロサンゼルス(NEW YORK/LOS ANGELES)

(c1) SUBJECT EXPRESSION=ニューヨーク(NEW YORK)
    EDITED RESULT EXPRESSION=ロサンゼルス(LOS ANGELES)
    SEMANTIC CLASS=#CITY (d1) I'll go to Los Angeles.

(e1) ロサンゼルスへ行きます(I'LL GO TO LOS ANGELES.)
(e2) ロサンゼルスには何時に着きますか(WHAT TIME DOES IT ARRIVE AT LOS ANGELES?)
(e3) シャルルドゴール空港行きのシャトルはいくらですか(HOW MUCH IS THE SHUTTLE TO CHARLES DE GAULLE AIRPORT?)
(e4) ロサンゼルス空港へ行きたい(I'd like to go to Los Angeles airport.)

(f1) What time does it arrive at Los Angeles?

(g1) [エンパイアステートビル#POI]はどこですか(WHERE IS THE [EMPIRE STATE BUILDING#POI]?)
(g2) [ハリウッド#POI]を見てみたいです(I'D LIKE TO SEE [HOLLYWOOD#P01].)

(h1) チャイニーズシアターはどこですか(WHERE IS THE CHINESE THEATER?)
(h2) ユニバーサルスタジオはどこですか(WHERE IS THE UNIVERSAL STUDIO?)
(h3) ハリウッドはどこですか(WHERE IS HOLLYWOOD?)
(h4) ハリウッドを見てみたいです(I'D LIKE TO SEE HOLLYWOOD.)

(i1) [チャイニーズシアター|ユニバーサルスタジオ|ハリウッド]はどこですか(WHERE IS THE [CHINESE THEATER|UNIVERSAL STUDIO|HOLLYWOOD]?)

FIG. 13

INPUT APPARATUS, INPUT METHOD AND INPUT PROGRAM

CROSS-REFERENCE TO RELATED APPLICATIONS

This application is based upon and claims the benefit of priority from prior Japanese Patent Application No. 2005-284282, filed Sep. 29, 2005, the entire contents of which are incorporated herein by reference.

BACKGROUND OF THE INVENTION

1. Field of the Invention

The present invention relates to an input apparatus, an input method and an input program for providing an example expression to a user that may be suitable to the user's usage history.

2. Description of the Related Art

In recent years, the practical use of human interfaces utilizing speech input has expanded. For instance, a speech-operated system exists in which a user provides speech input to enter a particular preset command, and the system recognizes the speech input to execute the operation corresponding to the command, thus allowing the user to operate the system by speech. In addition, a system is available in which a user speaks a sentence, and the system analyzes and converts the sentence to a character string, thus allowing the creation of text by speech input.

Furthermore, the following systems also exist: a speech-to-speech translation system which translates speech input in a first language into a second language and outputs the translated speech to support interlingual communications, and a spoken dialog system which is intended to allow for spoken interaction between a user and the system.

In these systems, speech recognition technology is used which converts a speech signal spoken by a user to digital data, and compares the data with predetermined data patterns to recognize the speech.

In speech recognition, incorrect recognition is likely to occur because of the influence of noise in the surrounding environment, as well as differences in speech quality, volume and speech speed of a particular user. In addition, since a user has to provide a speech input again if the first speech input is incorrectly recognized, significant effort can be required to operate such systems. Furthermore, when a given sentence is accepted, subsequent processing loads such as for comparison processing using accepted sentences are increased due to the additional data, and this can cause more difficulty in obtaining sufficient accuracy in the speech recognition process.

In Patent Reference 1 (Jpn. Pat. Appln. KOKAI No. 2000-200275), an input apparatus is proposed in which examples are presented to a user including descriptions of speech input entries, the user references the examples, and the user partially edits one of the examples to create a speech input. According to this method, since the entries can be restricted to the examples presented to the user or the partially edited example, the speech recognition process can be performed with a high degree of accuracy. In addition, since the user can reference the examples to obtain the guidance of the speech input entry descriptions, speech entry processing can be performed more easily.

However, the method of Patent Reference 1 has the limitation that the examples to be presented to the user are already prepared in the input apparatus, and therefore suitable candidates cannot be presented for all users such as those having differences in gender, ages, occupations and travel experiences.

Thus, in most cases, it is necessary to partially edit an example using this method, and thus a user has to make a speech input almost all the time. In addition, the method requires speech recognition that is sometimes performed incorrectly. Thus, a user may have to perform multiple iterations of speech reentry when incorrect speech recognition cannot be reduced.

The invention has been made in view of these circumstances.

SUMMARY OF THE INVENTION

According to embodiments of the present invention, an input apparatus includes: an example storage module to store a plurality of example expressions; an edit storage module to store edits when a user edits the plurality of example expressions; a presentation example determining module to determine one or more presentation examples to be presented to the user from the plurality of example expressions stored in the example storage module; an edit adapting module to edit the presentation examples determined by the presentation example determining module based on the edits stored in the edit storage module; a display control module to present the presentation examples determined by the presentation example determining module to the user; and an entry accepting module to accept one of the presentation examples as a selected example when one of the presentation examples is selected by the user, or to receive edits from the user to one of the presentation examples and accept the edited presentation example as the selected example.

In addition, the invention is an input method and an input program, which can implement the apparatus.

According to embodiments of the present invention, an editing done by a user is reflected to present an example having a suited entry description for every user. Accordingly, such advantages can be exerted that the necessity to make an editing input for an example is reduced and operation efforts done by the user can be reduced.

BRIEF DESCRIPTION OF THE DRAWINGS

The teachings of the invention can be readily understood by considering the following detailed description in conjunction with the accompanying drawings, in which:

FIG. 2 shows an illustration depicting an exemplary data structure of examples to be stored in an example storage module;

FIG. 3 shows an illustration depicting an exemplary data structure of the descriptions of editings to be stored in an edit storage module;

FIG. 9 shows an illustration depicting exemplary items of data for processing in a speech translation process;

FIG. 11 shows an illustration depicting an exemplary data structure of semantic relationships to be stored in a semantic relationship storage module;

FIG. 13 shows an illustration depicting exemplary items of data for processing in a speech translation process.

DETAILED DESCRIPTION OF EMBODIMENTS

Hereinafter, the best modes of an input apparatus, an input method and an input program according to embodiments of the invention will be described in detail with reference to the drawings.

First Embodiment

In a first embodiment, an input apparatus according to the invention will be described as a part of a speech translation apparatus which translates Japanese into English using example-based translation. The possible combinations of original language and target language are not, however, limited to Japanese and English. The invention can be adapted to any combination of languages.

In addition, the input apparatus is not limited to a speech translation apparatus. Embodiments of the invention can be adapted to any device with functionality to present examples with predetermined entry descriptions and to accept an example selected by a user from the presented examples. For instance, the input apparatus according to embodiments of the invention can be adapted to input interfaces such as a car navigation system and a home electrical product control system.

A speech translation apparatus according to the first embodiment stores an edit when a user edits an example expression stored in a storage module. Before the example expression is presented to the user, the stored example expression is edited according to the edits stored in the storage module that correspond to the example expression.

Figure 1:
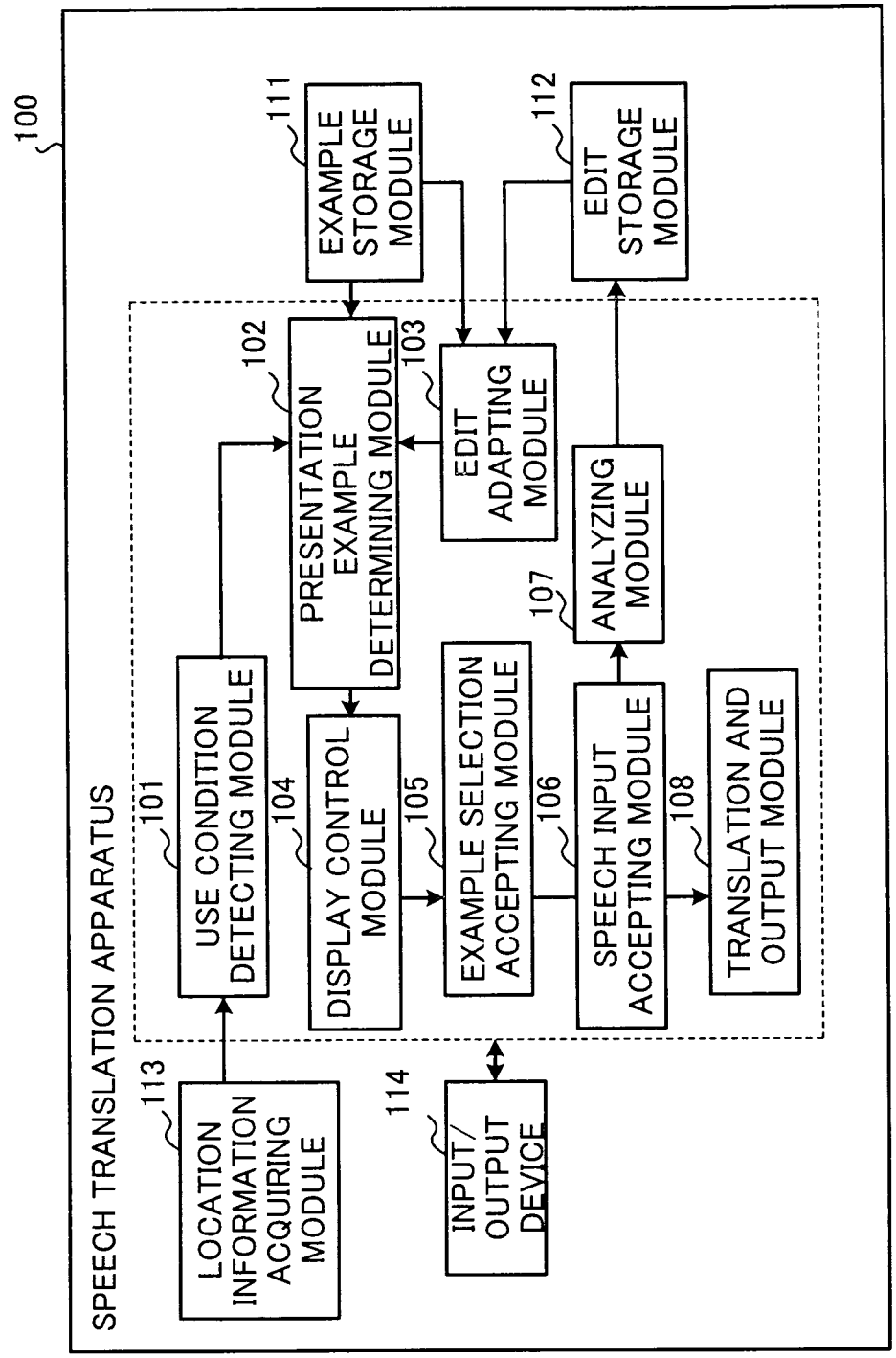
FIG. 1 shows a block diagram depicting the configuration of a speech translation apparatus according to a first embodiment.

FIG. 1 shows a block diagram depicting the configuration of a speech translation apparatus 100 according to the first embodiment. As shown in the drawing, the speech translation apparatus 100 has an example storage module 111, an edit storage module 112, a location information acquiring module 113, an input/output device 114, a use condition detecting module 101, a presentation example determining module 102, an edit adapting module 103, a display control module 104, an example selection accepting module 105, a speech input accepting module 106, an analyzing module 107, and a translation and output module 108.

The example storage module 111 stores examples of translations which are pairs of semantically equivalent Japanese and English example expressions, and can be comprised of typical storage modules such as a HDD (Hard Disk Drive), an optical disc, a memory card, or a RAM (Random Access Memory).

FIG. 2 shows an illustration depicting an exemplary data structure of example translations to be stored in the example storage module 111. As shown in the drawing, the example storage module 111 associates an example ID which uniquely identifies an example translation, including a Japanese and an English expression that have the same meaning. The example storage module 111 may also store situations where the expressions are used.

The type of situation where the corresponding example expression is used is stored in the situation column. For instance, "TRANSPORT" represents a situation relating to the use of transportation, "FAMILY" represents a situation relating to families and relatives, and "SIGHTSEEING" represents a situation relating to sightseeing.

The examples denoted by example ID's p01 to p14 in the drawing are examples which are associated with words that are used independently of the stored situations, and these are identified by the symbol "-" in the situation column. Conversely, the examples denoted by example ID's q01 to q07 in the drawing are examples related to various situations in which the apparatus can be used. Words included in a sentence can be terminated with a symbol "#" followed by a semantic attribute (semantic class) which denotes the meaning of the word or words. As shown, the symbols "[" and "]" denote the words referred to by the "#" symbol and thus corresponding to the semantic class.

For instance, "#CITY" is a semantic class denoting a city, "#PERSON" is a semantic class denoting a person, "#POI" is a semantic class denoting a point of interest, and "#AIRPORT" is a semantic class denoting an airport.

The portion of the expression corresponding to the semantic class is the portion that is likely to be edited by the edit adapting module 103, as described later. In addition, in the examples shown in the drawing, the semantic class is assigned only to noun expressions, but this configuration may be expanded to other parts of speech.

The example storage module 111 stores the correspondence between individual portions of Japanese and English expressions. Thus, it is possible to determine which portion of an expression in one language corresponds to which portion of an expression in the other language.

The edit storage module 112 stores an edit when a user edits an example presented to the user. The editing storage module 112 can be comprised of typical storage modules such as a HDD, an optical disc, a memory card or a RAM.

FIG. 3 shows an illustration depicting an exemplary data structure of edits stored in the edit storage module 112. As shown in the drawing, the edit storage module 112 associates an edit ID which uniquely identifies an edit, and associates the edit with a source example ID representing the example ID of the source example which was edited, a subject expression, an edited result expression, and a semantic class.

Here, the subject expression denotes the original wording of the part of the source example that has been edited. The edited result expression denotes the modified wording used to replace the subject expression. In the "semantic class" column, a semantic class is stored when there is a semantic class corresponding to the subject expression.

For instance, suppose that for an example ID=q01 shown in FIG. 2, an edit is obtained where a Japanese user edits the Japanese words for "New York" and replaces them with the Japanese words for "Los Angeles". In this case, "q01" is the source example ID, the Japanese words for "New York" are the subject expression, and the words "Los Angeles" are the edited result expression. In addition, since the semantic class "#CITY" for the Japanese words "New York" of the subject expression can be obtained from the example ID=q01 in the example storage module 111, this value is also set in the semantic class column in the edit storage module 112. This is shown in FIG. 3 as an edit corresponding to an edit ID=r01.

The edits stored in the edit storage module 112 can be deleted in accordance with a predetermined elapsed time period, a change of locations, a change of users, etc. In addition, a plurality of edit storage modules 112 may be prepared in order to substitute for the edit storage module 112 according to a predetermined elapsed time period, a change of locations, a change of users, etc.

The location information acquiring module 113 acquires location information about the latitude and longitude of the speech translation apparatus 100 with a GPS reception function. However, the location information is not necessarily limited to the latitude and longitude. Any information may be used as long as the information can identify where the speech translation apparatus 100 is located.

In addition, the location information acquiring module 113 may be configured to obtain location information from an access point of a wireless LAN (Local Area Network), detected when a communication module (not shown) is connected to the LAN. The location information acquiring module 113 may also be configured to obtain location information through a detecting module (not shown) from a wireless tag or a bar code containing location information.

The input/output device 114 has a display such as a liquid crystal display which displays an operation screen and examples determined by the presentation example determining module 102, an input device for input from a button, a keyboard, and a speech input microphone, and an output device such as a speaker which outputs a translation created by the translation and output module 108 in synthesized speech in the target language.

In addition, the input/output device 114 may include a touch panel which serves as the display as well as the input device. Thus, a user can touch the touch panel to select an example from a plurality of the examples presented on the display.

The use condition detecting module 101 detects a use condition for the speech translation apparatus 100 from location information acquired by the location information acquiring module 113. Here, the use condition is information that specifies the situation in which the speech translation apparatus 100 is being used. For example, in the situation where a user is using transportation, "use of transportation" is detected as the use condition, in the situation where a user visits a tourist attraction, "sightseeing" is detected as the use condition, and in the situation in which a user talks about family, "family" is detected as the use condition.

In addition, a plurality of preset use conditions may be presented to a user, in this case the use condition detecting module 101 detects the use condition selected by the user.

The presentation example determining module 102 acquires the example associated with situation information relating to the detected use condition from the example storage module 111, and determines that this example is to be presented to a user.

For instance, when the use condition detecting module 101 detects the use condition where the speech translation apparatus 100 is being used in the airport, the presentation example determining module 102 selects the example associated with the situation "TRANSPORT" relating to the use of transportation. In the example shown in FIG. 2, the examples of example ID's q01 to q04 are determined as the presentation examples to present to the user.

The edit adapting module 103 refers to the edits stored in the edit storage module 112, and edits the presentation example or examples determined by the presentation example determining module 102. There are two methods described below for editing a presentation example.

In the first method, when the presentation example includes the expression described in the column of the subject expression in the edit storage module 112, the portion of the presentation example corresponding to the subject expression is replaced by the corresponding edited result expression.

In the second method, when the presentation example includes an expression with the same semantic class as the semantic class described in the semantic class column in the edit storage module 112, the portion of the presentation example corresponding to the semantic class is replaced by the edited result expression associated with the semantic class.

The display control module 104 presents the operation screen and the example determined by the presentation example determining module 102 on the display of the input/output device 114.

The example selection accepting module 105 accepts a selection by a user of one of the presentation examples presented on the display of the input/output device 114. For instance, as described above, the input/output device 114 can be configured to allow a user to select the presentation example with the touch panel that also serves as the display and the input device.

The method of accepting the presentation example is not limited to those described above. For instance, a button associated with each presentation example may be pressed to accept a selection of the presentation example. Alternately, a symbol such as a cursor or mark may identify one of the examples, and a button or dial provided to move the symbol, and the press of a button used to select the presentation example identified by the symbol.

The speech input accepting module 106 receives speech input from a user through a speech input microphone, converts the received speech to an electric signal that can be processed by the analyzing module 107, and outputs the signal. More specifically, speech input accepting module 106 receives speech, converts the speech to an electric signal by A/D (analog/digital) conversion, and outputs digital data converted to a PCM (pulse code modulation) representation, for instance. These processes can be implemented with existing methods for digitizing speech.

The example selection accepting module 105 and the speech input accepting module 106 can correspond to an entry accepting module according to embodiments of the invention.

The analyzing module 107 receives a speech signal in the form of digital data from the speech input accepting module 106, and executes a speech recognition process. In addition, the analyzing module 107 compares the presentation example with the speech recognition result and detects the unmatched portion. The analyzing module 107 specifies the unmatched portion of the presentation example as the edited portion. The analyzing module 107 then outputs edits corresponding to the presentation example, i.e., edits that associate the expression in the edited portion before editing with the expression after editing.

More specifically, the analyzing module 107 performs frequency analysis using the FFT (fast Fourier transform), and outputs characteristic information (for instance, a spectrum) necessary for speech recognition for every predetermined section of input speech in a time series. For instance, a predetermined section can be a character string such as words, a phoneme sequence such as accent phrases, and units such as phonemes and syllables. This process can be implemented by conventional speech analysis technology.

Furthermore, the analyzing module 107 compares the characteristic information with a speech analysis pattern stored in a speech recognition dictionary (not shown) to compute scores showing the similarity between the patterns in the dictionary and the spoken input, and outputs recognition candidates having the highest scores. Generally used methods such as Hidden Markov Models (HMM), Dynamic Programming (DP), and Neural Networks (NN) may be employed.

In addition, in order to improve recognition accuracy, a statistical language model, for example an N-gram model, can be used with the recognition candidates, and the candidate with the highest probability can estimated and selected.

In addition, in the first embodiment, the speech recognition process can be performed by selection of the presentation example by a user, or the presentation example can be partially edited and spoken for speech input. Therefore, in comparison to speech recognition based only on a speech input, the speech recognition process can be performed with a higher degree of accuracy.

More specifically, the analyzing module 107 performs a comparison between the phoneme sequence created from words forming each of the presentation examples and a phoneme sequence candidate previously obtained from speech recognition by a technique such as DP used before. Then, the source example is determined by the degree of matching in comparison to the candidate, and the unmatched portion between the presentation example and the speech recognition result is detected, so the edited portion of the presentation example can be specified.

The translation and output module 108 creates an English translation of the Japanese expression input by a Japanese user, and outputs the English translation on the display. In addition, the English translation can be output by speech; in this case the translation and output module 108 synthesizes speech from the English translation, and outputs synthesized speech to an output device such as the speaker.

Methods generally known can be adapted for the speech synthesis process, including a text-to-speech system using speech synthesis by editing speech segments, format speech synthesis, etc.

Figure 4:
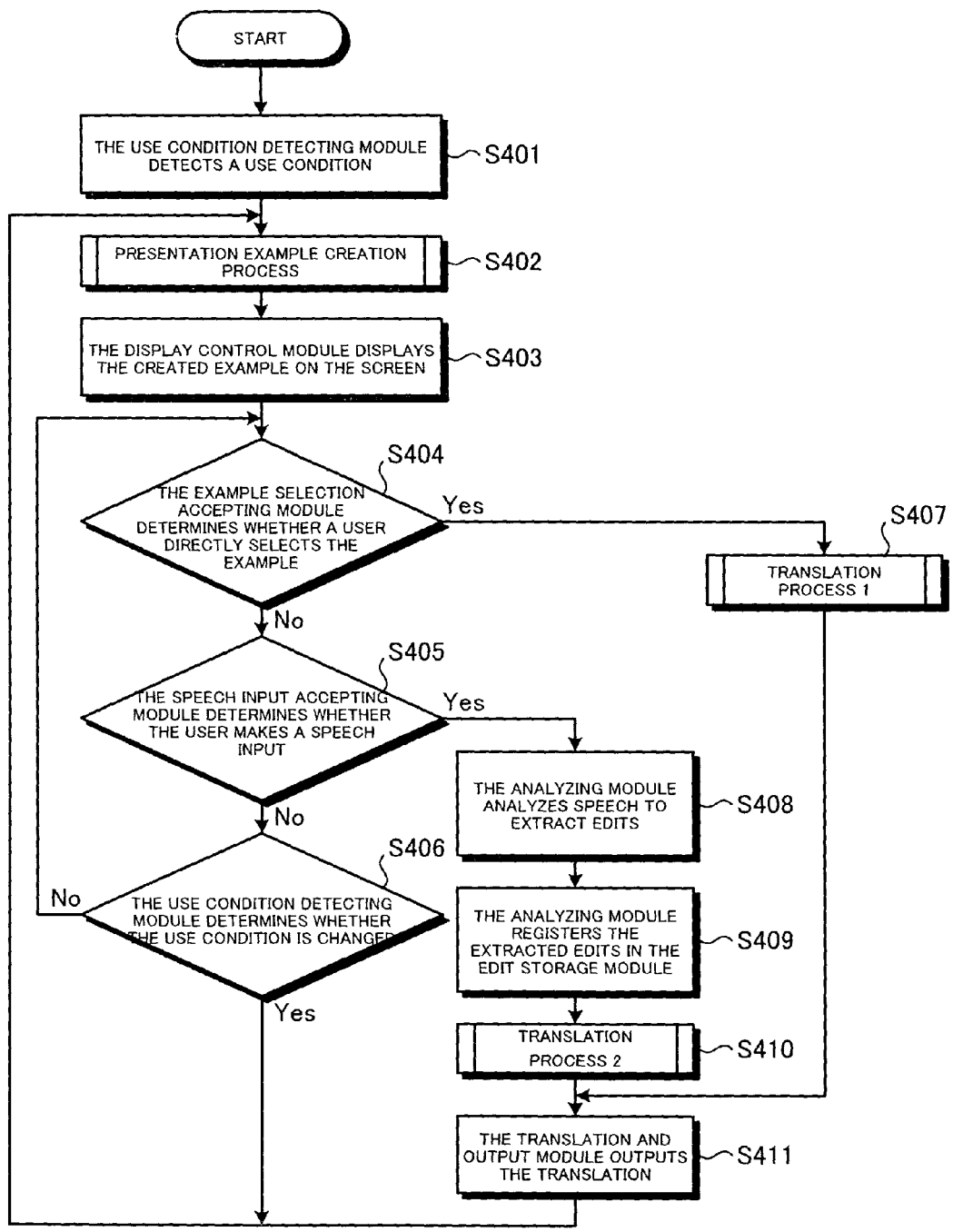
FIG. 4 shows a flow chart depicting the overall flow of a speech translation process according to the first embodiment.

Next, a speech translation process performed by the speech translation apparatus 100 according to the first embodiment will be described. FIG. 4 shows a flow chart depicting the overall flow of the speech translation process according to the first embodiment.

First, the use condition detecting module 101 detects a use condition, and stores it in a temporary storage module such as a RAM (not shown) (Step S401). The stored use condition is referenced for determining the presentation examples to be presented by the presentation example determining module 102.

Subsequently, the example storage module 111 and the edit storage module 112 are referenced to determine an example for presentation, and a presentation example creation process is performed to create an edited example reflecting the edits (Step S402). The details of the presentation example creation process will be described later.

Subsequently, the display control module 104 displays the example created in the presentation example creation process on the display of the input/output device 114 (Step S403). Then, the example selection accepting module 105 determines whether a user directly selects the example (Step S404). To directly select the example means that the user selects the example on the touch panel, or selects the example by pressing down the corresponding button without editing the example displayed on the screen.

When the user directly selects the example (Step S404: YES), a translation process 1 is performed to create a translated sentence corresponding to the selected example (Step S407). The detail of the translation process 1 will be described later.

When it is determined that the user has not directly selected the example (Step S404: NO), the speech input accepting module 106 determines whether the user provides a speech input (Step S405).

When it is determined that a speech input is provided (Step S405: YES), the analyzing module 107 analyzes the input speech to extract editing information (Step S408). More specifically, the input speech undergoes speech recognition to analyze which presented example the input speech corresponds to, and, whether a portion to be edited exists in this presentation example. When a portion to be edited exists, the subject expression (that is, the expression before editing) and the edited result expression (that is, the expression after editing) are acquired. In addition, the semantic class associated with the subject expression is acquired from the example storage module 111.

As described above, the source example for editing is specified, and edits can be extracted that associate the source example ID (i.e., the presentation example ID), the subject expression, the edited result expression, and the semantic class with one another.

Subsequently, the analyzing module 107 registers the extracted edits in the edit storage module 112 (Step S409). Thus, the edits can be referenced in subsequent processes, and the example stored in the example storage module 111 can be edited.

Subsequently, a translation process 2 is performed to create a translated sentence corresponding to the speech input (Step S410). The details of the translation process 2 will be described later.

After performing the translation process 1 at Step S407 or the translation process 2 at Step S410, the translation and output module 108 outputs the translation to the display of the input/output device 114 or the output device such as the speaker (Step S411).

In addition, the number of examples to be output may be limited in accordance with the frequency of use of the example. Thus, a more suitable example can be presented for the user, and the effort required to select an example can be reduced. For example, when the display area in a mobile device is small, it is possible to eliminate some of the effort required to scroll the screen to confirm all the examples.

When it is determined that a speech input has not been made at Step S405 (Step S405: NO), the use condition detecting module 101 determines whether the use condition is changed (Step S406).

When the use condition is not changed (Step S406: NO), the process returns to the determination process for determining whether the user directly selects the example, and the process is repeated (Step S404).

When the use condition is changed (Step S406: YES), or after the translation is output at Step S411, the process returns to Step S402 for creating and displaying another example, and the process is repeated.

Figure 5:
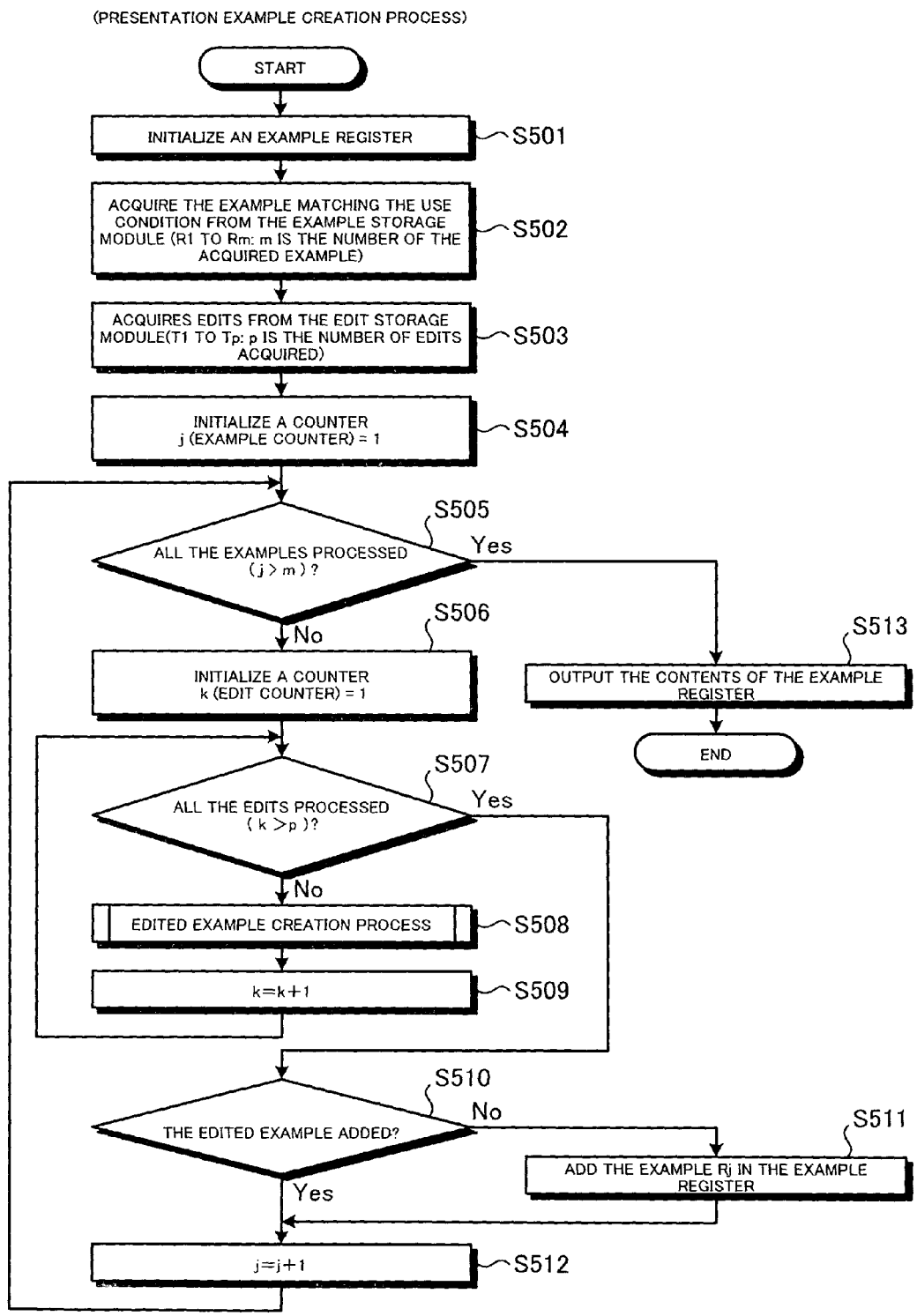
FIG. 5 shows a flow chart depicting the overall flow of a presentation example creation process according to the first embodiment.

Next, the detail of the presentation example creation process shown at Step S402 will be described. FIG. 5 shows a flow chart depicting the overall flow of the presentation example creation process according to the first embodiment.

First, the presentation example determining module 102 initializes an example register which stores the created example (Step S501). The example register is contained in the presentation example determining module 102 and is a storage area in a temporary storage module such as a RAM.

Subsequently, the presentation example determining module 102 acquires the example matched with the use condition from the example storage module 111 (Step S502). The acquired example is denoted by R1 to Rm (m is the number of acquired examples).

For instance, suppose that the location information acquiring module 113 acquires location information indicating that the place at which the speech translation apparatus 100 is being used is an airport or other transportation station by the GPS reception function. Then, the use condition detecting module 101 detects that the use condition is "use of transportation".

Suppose further that the example storage module 111 stores the examples shown in FIG. 2. Then, for the examples associated with "TRANSPORT," that is, the situation relating to the detected use condition "use of transportation," the presentation example determining module 102 acquires the examples of the example ID's q01 to q04 from the example storage module 111.

Subsequently, the presentation example determining module 102 acquires all the edits from the edit storage module 112 (Step S503). In addition, the acquired edits are denoted by T1 to Tp (p is the number of edits acquired).

Subsequently, the presentation example determining module 102 initializes an example counter j which counts the examples after they are processed (Step S504). The counter is initialized by setting j equal to 1.

Subsequently, the presentation example determining module 102 determines whether all the examples have been processed (Step S505), i.e., presentation example determining module 102 determines whether the example counter j is greater than the number m of acquired examples.

When all the examples have not been processed (Step S505: NO), an edit counter k is initialized which counts the edits after the edits have been processed (Step S506). Edit counter k is initialized by setting k to 1.

Subsequently, the presentation example determining module 102 determines whether all the edits are processed (Step S507). More specifically, it is determined whether the edit counter k is greater than the number p of acquired edits.

If all the edits are not processed (Step S507: NO), edits are adapted to perform an edited example creation process to create an edited example (Step S508). The details of the edited example creation process will be described later.

After performing the edited example creation process, the edit counter k is incremented by 1 (Step S509), the process returns to the determination process for determining whether all the edits have been processed, and the process is repeated (Step S507).

When it is determined that all the edits have been processed at Step S507 (Step S507: YES), the presentation example determining module 102 determines whether the edited example is added in the edited example creation process (Step S510).

When the edited example is not added (Step S510: NO), the presentation example determining module 102 adds an example Rj in the example register (Step S511). If example Rj is edited, the edited example is added to the example register. It is necessary to add the example Rj itself to the example register when the example Rj is not edited.

In addition, when an identical example already exists in the example register, the presentation example determining module 102 does not add the example to the example register.

If the edited example is added at Step S510 (Step S510: YES), or if the example Rj is added to the example register at Step S511, the presentation example determining module 102 increments the example counter by 1 (Step S512). After the example counter is incremented by 1, the presentation example determining module 102 returns to the determination process for determining whether all the examples have been processed, and the process is repeated (Step S505).

When it is determined that all the examples have been processed at Step S505 (StepS505: YES), the presentation example determining module 102 determines the presentation examples from the example register, and outputs the presentation examples (Step S513).

Figure 6:
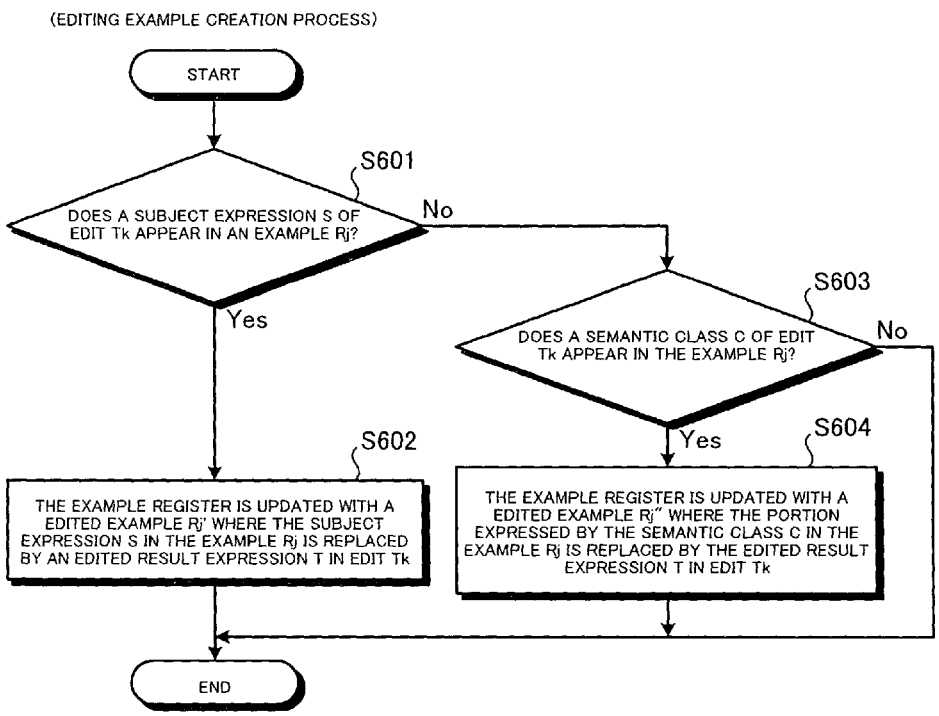
FIG. 6 shows a flow chart depicting the overall flow of an edited example creation process according to the first embodiment.

Next, the details of the edited example creation process shown at Step S508 will be described. FIG. 6 shows a flow chart depicting the overall flow of the edited example creation process according to the first embodiment.

First, the edit adapting module 103 determines whether a subject expression S of edit Tk appears in an example Rj (Step S601). When Rj contains the subject expression S (Step S601: YES), an edited example Rj' is added to the example register. The portion corresponding to the subject expression S in the example Rj is replaced by an edited result expression T in editing information Tk to form Rj' (Step S602).

For instance, suppose that the example expressions of the example ID's q01 to q04 shown in FIG. 2 are acquired, and the edits for edit ID's r01 and r02 as shown in FIG. 3 are acquired. Suppose further that the edited example creation process is performed where the example counter j=1, and the edit counter k=1. The subject expression S of edit Tk is the subject expression "New York (in Japanese)" in the edit represented by the edit ID=r01.

The example Rj corresponds to example ID=q01 "I'll go to [New York#CITY] (in Japanese)". Since the subject expression "New York (in Japanese)" appears in the example, this portion is replaced by the edited result expression "Los Angeles (in Japanese)" in the edit represented by the edit ID=r01, and edited example Rj', "I'll go to Los Angeles (in Japanese)" is added to the example register.

If the subject expression S of edit Tk does not appear in the example Rj at Step S601 (Step S601: NO), the edit adapting module 103 determines whether a semantic class C of edit Tk appears in the example Rj (Step S603).

If so, (Step S603: YES), an edited example Rj" is added to the example register, where in RJ" the portion represented by the semantic class C in the example Rj is replaced by the edited result expression T in edit Tk (Step S604).

Based on the same premise as described above, suppose that the edited example creation process is performed where the example counter j=2, and the edit counter k=1. The semantic class C of edit Tk is the semantic class "#CITY" in the edit represented by the edit ID=r01.

In addition, the example Rj corresponds to example ID = q02, "What time does it arrive at [Chicago #City]? (in Japanese)". Since the semantic class "#CITY" appears in the example, this portion is replaced by the edited result expression "Los Angeles (in Japanese)" in the edit represented by the edit ID=r0I, and the edited example Rj" "What time does it arrive at Los Angeles? (in Japanese)" is added to the example register.

If the semantic class C of edit Tk does not appear in the example Rj at Step S603 (Step S603: NO), or after the edited example is added to the example register at Step S602 or Step S604, the edited example creation process is ended.

Since it is necessary to acquire the source example for editing in the translation process (described later), at Steps S602 and S604, information that can identify the source example for editing is associated with the edited example and output to the example register.

As described above, in the first embodiment, the examples registered beforehand in the example storage module 111 can be presented, and the edit storage module 112 can be referenced, to edit an example to reflect previous edits. Therefore, each users' history can be used to produce examples suitable to the users.

Next, the details of the translation process 1 shown at Step S407 will be described. The translation process 1 uses the same edits discussed above when the Japanese expression is converted to the English expression, and thus creates the correct translation corresponding to the selected Japanese example.

Figure 7:
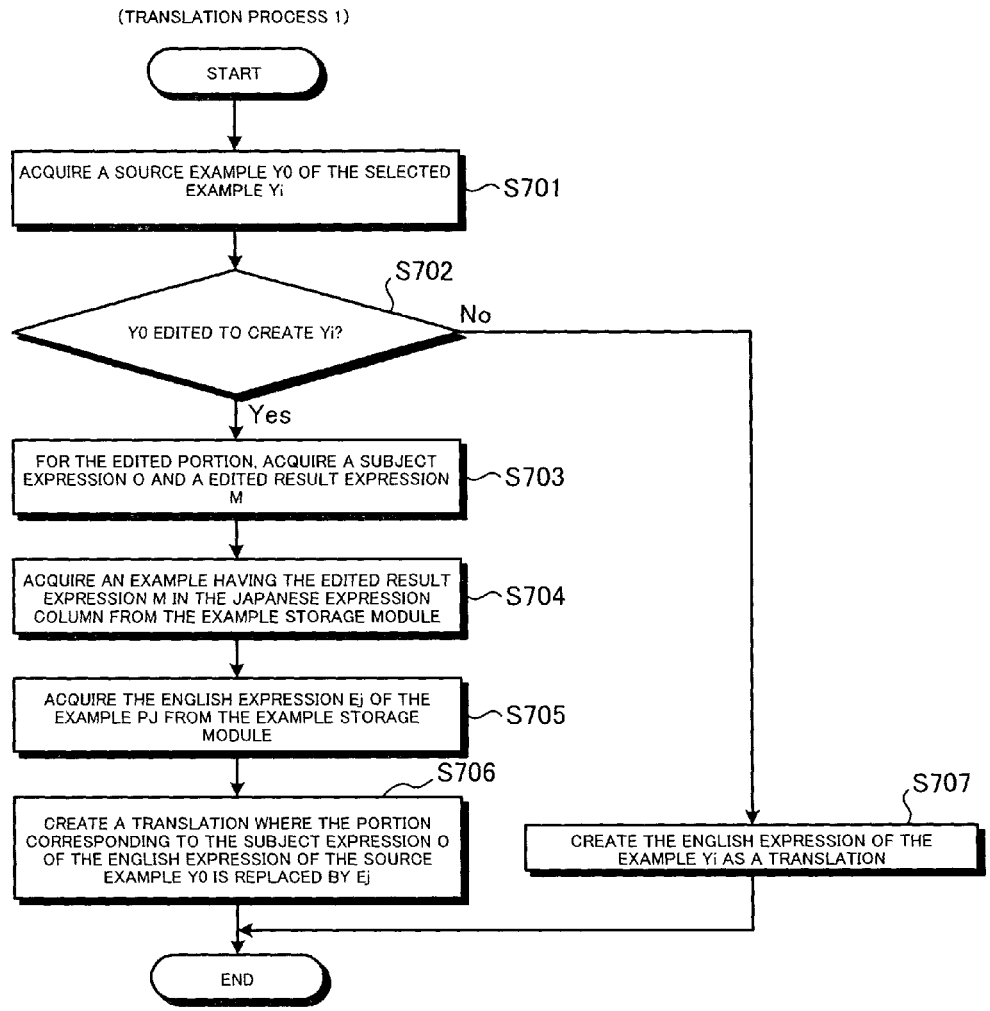
FIG. 7 shows a flow chart depicting the overall flow of a translation process 1 according to the first embodiment.

FIG. 7 shows a flow chart depicting the overall flow of the translation process 1 according to the first embodiment.

First, the translation and output module 108 acquires the source example for editing (hereinafter, referred to as an example Y0) of the example selected by a user (hereinafter, referred to as an example Y1) (Step S701), and determines whether the example Y0 is edited to create an example Yi (Step S702).

As described above, since information that identifies the source example for editing is output to the example register, this information can be referenced to acquire the example Y0. In addition, whether to store information that identifies the source example for editing can determine whether the example Y0 is edited to create the example Yi.

If the example Y0 is not edited to create the example Yi (Step S702: NO), that is, when the user selects the presentation example with no editing, the translation and output module 108 acquires the English expression of the example Yi from the example storage module 111, and creates it as a translation (Step S707).

When it is determined that the example Y0 is edited to create the example Yi (Step S702: YES), the translation and output module 108 acquires the subject expression (hereinafter, referred to as subject expression O) and the edited result expression (hereinafter, referred to as edited result expression M) of the edited portion (Step S703).

For instance, when the example expression "I'll go to [New York#CITY] (in Japanese)" is edited to "I'll go to Los Angeles (in Japanese)", the subject expression O is the words "New York (in Japanese)", and the edited result expression M is the words "Los Angeles (in Japanese)".

Subsequently, the translation and output module 108 acquires the example translation (hereinafter, referred to as example translation Pj) with the edited result expression M in the Japanese expression column from the example storage module 111 (Step S704). For instance, when the edited result expression M is the words "Los Angeles (in Japanese)" and the example translations shown in FIG. 2 are stored in the example storage module 111, the example translation with example ID =p02 is acquired.

Subsequently, the translation and output module 108 acquires the English expression of the example translation Pj (hereinafter, referred to as English expression Ej) from the example storage module 111 (Step S705). In the example described above, the words "Los Angeles (in English)" are acquired.

Subsequently, the translation and output module 108 creates a translation. The English expression of the source example Y0 (hereinafter, referred to as an English expression E0) has a portion corresponding to the subject expression O. This portion is replaced by the English expression Ej to create the translation (Step S706). In the example described above, the English expression E0 is "I'll go to New York", and the translation "I'll go to Los Angeles (in English)" is created by replacing the words "New York" with the English expression Ej ("Los Angeles").

If there are multiple edited portions, the processes from Step S703 to Step S706 are performed for all the edited portions.

After the translation and output module 108 creates the translation at Step S706 or Step S707, the translation and output module 108 ends the translation process 1.

Next, the details of the translation process 2 shown at Step S410 will be described. The translation process 2 uses the same edits used when the user input edits the presented example and applies these edits to the English expression, thus creating the correct translation corresponding to the selected Japanese example.

Figure 8:
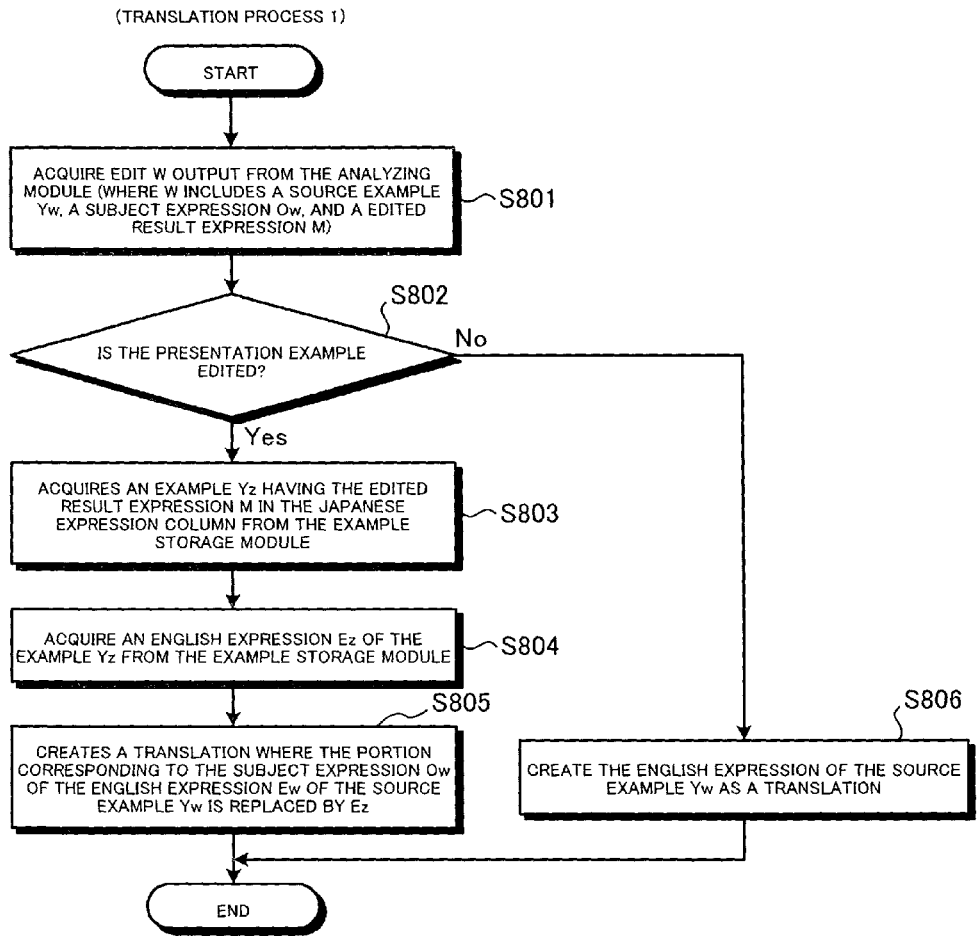
FIG. 8 shows a flow chart depicting the overall flow of a translation process 2 according to the first embodiment.

FIG. 8 shows a flow chart depicting the overall flow of the translation process 2 according to the first embodiment.

First, the translation and output module 108 acquires edits output from the analyzing module 107 (hereinafter, referred to as edits W) (Step S801), and determines whether the presentation example is edited by a user (Step S802).

The edits W include the source example for editing (hereinafter, referred to as example Yw), the subject expression, that is the expression before being edited (hereinafter, the subject expression Ow), and the edited result expression, that is, the expression after being edited (hereinafter, the edited result expression M). In addition, when the user does not edit the presented example, the edits W include information indicating that no editing has been done. Thus, the translation and output module 108 references to this information to determine whether there are edits.

If the presentation example is not edited at Step S802 (Step S802: NO), that is, when the user selects the example by speech input with no editing to the presentation example, the translation and output module 108 acquires the English expression of the example Yw from the example storage module 111, and creates it as the translation (Step S806).

If the presentation example is edited (Step S802: YES), the translation and output module 108 acquires the example translation with an edited result expression M in the Japanese expression column (hereinafter, referred to as example Yz) from the example storage module 111 (Step S803). For instance, when the edited result expression M is the words "Los Angeles (in Japanese)" and the example translations shown in FIG. 2 are stored in the example storage module 111, the example translation for example ID=p02 is acquired.

Subsequently, the translation and output module 108 acquires the English expression of the example Yz (hereinafter, referred to as English expression Ez) from the example storage module 111 (Step S804). In the example described above, the words "Los Angeles (in English)" are acquired.

Subsequently, the translation and output module 108 creates a translation. The English expression of the source example Yw (hereinafter, English expression Ew) has a portion corresponding to the subject expression Ow. This portion is replaced by the English expression Ez (Step S805). In the example described above, the English expression Ew is "I'll go to New York." The translation "I'll go to Los Angeles (in English)" is created by replacing the words "New York" with the English expression Ez ("Los Angeles").

In addition, when there are multiple edited portions, the processes from Step S803 to Step S805 are performed for all the edited portions.

After the translation and output module 108 creates the translation at Step S805 or Step S806, it ends the translation process 2.

Next, a specific example of the speech translation process will be described that is executed in accordance with the procedures described above. FIG. 9 shows an illustration depicting exemplary items of data processed in the speech translation process.

Suppose the example storage module 111 stores the examples shown in FIG. 2 and the edit storage module 112 does not store edits.

Further, suppose that a user specifies use of transportation as the use condition, and the use condition detecting module 101 detects this (Step S401). In this case, for the example having "TRANSPORT" of the related situation in the situation column, the example translations for example ID's q01, q01, q02, q03 and q04 are acquired from the example storage module 111 (Step S502). Since the edit storage module 111 is empty, edits are not acquired (Step S503).

Since there are no edits, the edited example is not added in the edited example creation process (Step S508), and the four acquired examples are added to the example register as they are (Step S511).

Consequently, four examples shown in (a1) to (a4) in FIG. 9 are displayed on the display of the input/output device 114 (Step S403).

Now suppose that a user makes a speech input to partially edit (a1) to create the sentence "I'll go to Los Angeles (in Japanese)."

In this case, the speech input accepting module 106 determines that a speech input is made (Step S405: YES), and the analyzing module 107 extracts edits (Step S408).

(b1) shown in FIG. 9 shows edits output by the analyzing module 107. In this example, the source example ID q01 corresponds to (a1). For the edits, the subject expression is the words "New York (in Japanese)", and the edited result expression is the words "Los Angeles (in Japanese)".

The edits are output to the edit storage module 112 (Step S409). In the example above, the same edits for the edit ID r01 in FIG. 3 are output. (c1) shown in FIG. 9 shows the edits output to the edit storage module 112. In addition, since the words "New York (in Japanese)" in the edited portion is identified with the semantic class "#CITY" for example ID=q01, "#CITY" is set in the semantic class column of edits for edit ID=r01.

In the translation process 2 (Step S410), edits shown in (b1) in FIG. 9 are acquired (Step S801). In addition, since an edit exists (Step S502: YES), the example translation for example ID=p02 is acquired from the example storage module 111 (Step S803). This example translation is acquired because it has the words "Los Angeles (in Japanese)" from the edited result expression in the Japanese expression column.

Furthermore, the words "Los Angeles," i.e., the English expression for example ID=p02, are acquired from the example storage module 111 (Step S804). The words "I'll go to New York" are the English expression for example ID=q01, and example ID=q01 the source example. Thus, "New York," which is the portion of the English expression corresponding to the subject expression "New York (in Japanese)" is replaced by the words "Los Angeles (in English)." In this manner, "I'll go to Los Angeles (in English)" is created as the translation (Step S805).

Consequently, the translation shown in (d1) in FIG. 9 is displayed on input/output device 114 (Step S411). Instead of displaying the translation, the translation may be synthesized as speech, and output to the speaker.

As described above, the user provides a speech input so that the presentation example is partially edited. The edits are based on the user's intentions, to expressions chosen using the use condition, and in this manner the user can obtain a translation.

After that the translation is obtained, the process continues, and the presentation example creation process is performed again (Step S402). Here, since the edit storage module 112 stores edits, edits shown in (c1) in FIG. 9 are acquired (Step S503). Since the use condition has not changed, the example translations for example ID's q01, q02, q03, and q04 are acquired from the example storage module 111 in the manner discussed above (Step S502).

In this case, since edits exist, the edited example creation process is executed (Step S508). For example ID=q01, the words "New York (in Japanese)" appear as the subject expression (Step S601: YES), this portion is replaced by the edited result expression, i.e., the words "Los Angeles (in Japanese)" (Step S602). In (e1) shown in FIG. 9, the result is shown.

For example ID=q02, the subject expression "New York (in Japanese)" does not appear (Step S601: NO). On the other hand, the sentence "What time does it arrive at [Chicago#CITY] (in Japanese)" includes the same semantic class as the semantic class "#CITY" of the edit. Therefore, the word "[Chicago#CITY] (in Japanese)" is replaced by the words "Los Angeles (in Japanese)" (Step S603: YES, Step S604). In (e2) shown in FIG. 9, the result is shown.

After this, similar processes continue. However, since example ID=q03 and example ID=q04 do not have expressions matching the subject expression or expressions matching the semantic class, the examples are added to the example register as they are (Step S511).

Consequently, four examples as shown in (e1) to (e4) in FIG. 9 are displayed on the input/output device 114 (Step S403).

As described above, an example translation can be represented that has the same edits as previously applied edits, and thus the necessity for a user to edit an example translation can be reduced. In addition, the speech input and the speech recognition process for editing are eliminated, and thus user effort can be reduced.

Suppose that the example shown in (e2) in FIG. 9 is matched with an edit input by a user next time. In this case, it is unnecessary for the user to make a speech input, and the user can select the example through the touch panel or by pressing a button.

In this case, the example selection accepting module 105 determines that the user directly selects the example (Step S404: YES), and the translation process 1 is executed (Step S407).

In the translation process 1, example ID=q02 is acquired as the source example for editing of (e2) in FIG. 9 (Step S701). In addition, since an edit is made (Step S702: YES), the subject expression "Chicago (in Japanese)" and the edited result expression "Los Angeles (in Japanese)" are acquired (Step S703).

Subsequently, example ID=p02 is acquired from the example storage module 111, which has the words "Los Angeles (in Japanese)," i.e., the edited result expression, in the Japanese expression column (Step S704).

The words "Los Angeles" are acquired from the example storage module 111, as the English expression of the example ID=p02 (Step S705). Because the English expression "What time does it arrive at Chicago#CITY?" is the source example corresponding to example ID=q02, the word "Chicago (in English)" is replaced by the words "Los Angeles (in English)", and "What time does it arrive at Los Angeles? (in English)" is created as the translation (Step S706).

Consequently, the translation shown in (f1) in FIG. 9 is displayed on the input/output device 114 (Step S411).

Thus, an example translation that has not been used before can be edited to be an expression very likely to be selected by the user. This translation can be prepared in advance for presentation according to the use condition. This solves the problem of example-based interfaces that examples suitable for particular users cannot be prepared in advance. In addition, since the user is more likely to directly select the presented example, the number speech inputs can be reduced. This reduces the number of limitations on acceptable environments for use of the apparatus. More specifically, the apparatus can function effectively in environments which have levels of noise which are not conducive for speech input.

In the example described above, the description of speech entry is based on the premise that the entry is selected from the presented examples. Alternately, speech can be input and a speech entry can be generated using general speech recognition. This method can be combined with the example-based translation described above, as well as with rule-based translation. Further, characters may be handwritten and input for character recognition instead of inputting speech.

As described above, in the speech translation apparatus 100 according to the first embodiment, when a user edits example translations, the edits are stored. When the example translation is subsequently presented to the user, the stored edits are used for editing the example translation beforehand, and the edited example translation can be presented for the user. Therefore, example translations with edits suitable to individual users can be presented to each user, the users have to make fewer edits decreased, and the effort for each user can be reduced.

Second Embodiment

A speech translation apparatus according to a second embodiment is an apparatus that references a storage module which stores a semantic relationship between two expressions, in addition to the edits stored in the storage module, edits the example translation, and then presents it to a user.

Figure 10:
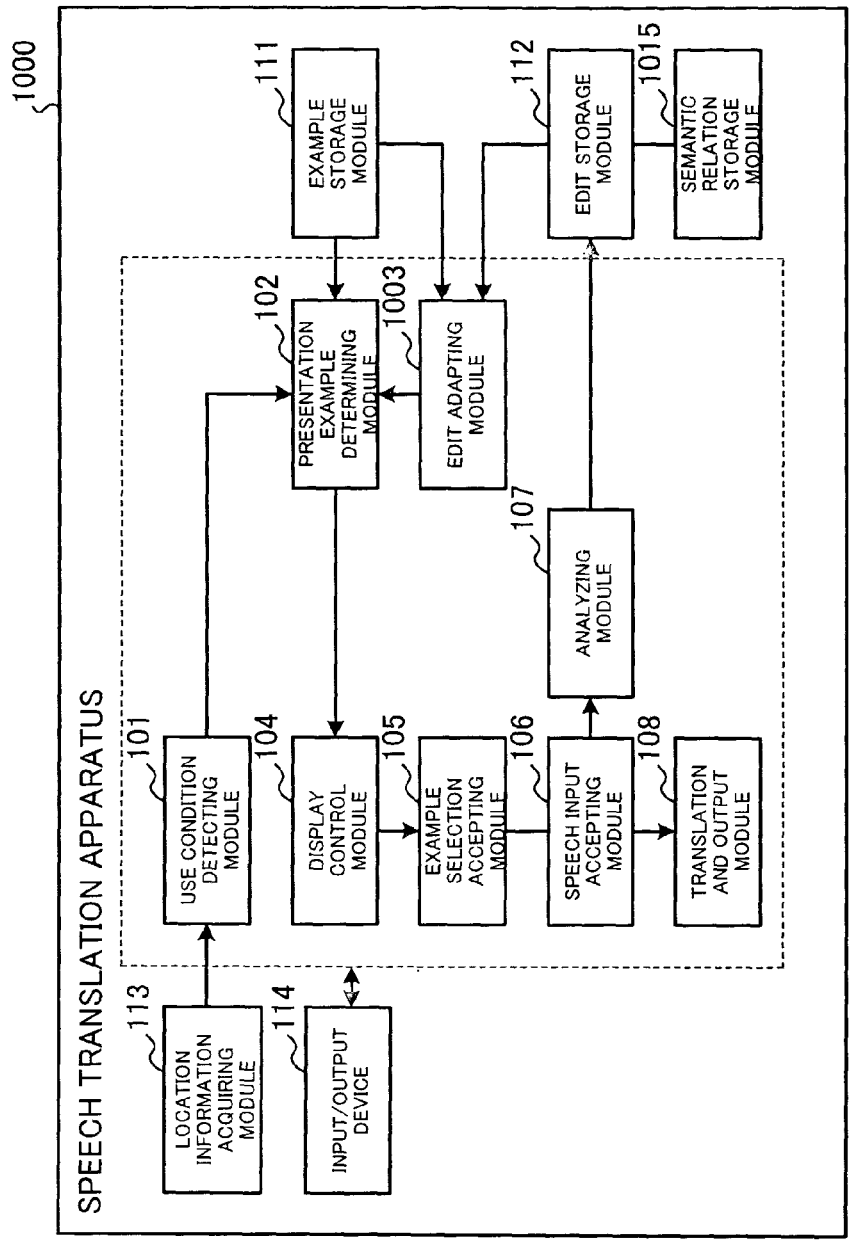
FIG. 10 shows a block diagram depicting the configuration of a speech translation apparatus according to a second embodiment.

FIG. 10 shows a block diagram depicting a speech translation apparatus 1000 according to the second embodiment. As shown in the drawing, the speech translation apparatus 1000 has an example storage module 111, an edit storage module 112, a location information acquiring module 113, an input/output device 114, a semantic relationship storage module 1015, a use condition detecting module 101, a presentation example determining module 102, an edit adapting module 1003, a display control module 104, an example selection accepting module 105, a speech input accepting module 106, an analyzing module 107, and a translation and output module 108.

The second embodiment is different from the first embodiment in that the semantic relationship storage module 1015 is added and the functionality of the edit adapting module 1003 is modified. Since the other configurations and functions are the same as those in FIG. 1 which is a block diagram depicting the configuration of the speech translation apparatus 100 according to the first embodiment, like elements are designated with the same numerals and signs, and their description is omitted here.

The semantic relationship storage module 1015 stores the semantic relationship between expressions stored in the example storage module 111, which can be comprised of typical storage modules such as a HDD, an optical disc, a memory card, or a RAM.

FIG. 11 shows an illustration depicting an exemplary data structure of the semantic relationship stored in the semantic relationship storage module 1015. As shown in the drawing, the semantic relationship storage module 1015 stores a knowledge ID which uniquely identifies the semantic relationship and associates it with a conceptual expression 1, a conceptual expression 2, and a relationship with between the conceptual expressions 1 and 2.

In the conceptual expression 1 and conceptual expression 2 columns, expressions that identify concepts having a particular semantic relationship are stored. In addition, in the relationship column, the semantic relationship between conceptual expression 1 and conceptual expression 2 is stored.

Here, the symbol "%" identifies the title of the semantic relationship. When meaning expressed by each of the semantic relationships is expressed in a sentence in Japanese word order such as "<conceptual expression 1> no <relationship> ha <conceptual expression 2> (in Japanese)", this corresponds to ("<relationship> of <conceptual expression 1> is <conceptual expression 2>" in English). For instance, the semantic relationship of knowledge ID=s04 has the meaning "<Los Angeles> no <main sightseeing spot> ha <Chinese Theater> (in Japanese)" corresponding to ("<main sightseeing spot> of <Los Angeles> is <Chinese Theater>" in English). Thus, the semantic relationship of knowledge ID=s06 has the meaning "<Los Angeles> no <main sightseeing spot> ha <Hollywood> (in Japanese)" corresponding to ("<main sightseeing spot> of <Los Angeles> is <Hollywood>" in English).

In addition, the data structure of the semantic relationship stored in the semantic relationship storage module 1015 is not limited to the structure shown in FIG. 11. The semantic relationships may be stored as a concept thesaurus. Further, in the semantic relationships may be stored in predicate form such as "time (eat (John, apple), today)", or the semantic relationships may be described in an intermediate language.

Similar to the edit adapting module 103 according to the first embodiment, the edit adapting module 1003 references edits stored in the edit storage module 112, and edits the presentation example determined by the presentation example determining module 102. There is a third editing method described below, in addition to two methods described according to the first embodiment.

The third method works by replacing an expression F1 of an example translation X with an expression F2. This replacement is performed when the edit storage module 112 has an edit L that modifies an expression E1 to another expression E2, and the semantic relationship storage module 1015 has a stored semantic relationship R between expressions E1 and F1 and the same stored semantic relationship R exists between expressions E2 and F2. This occurs when the example translation X, determined to be a presentation example, includes the expression F1.

A speech translation process performed by the speech translation apparatus 1000 according to the second embodiment will be described next. The second embodiment is different from the first embodiment in that an edit is made by applying the third method in an edited example creation process. The descriptions of the other processes are the same as those of the first embodiment, and the explanation is omitted.

Figure 12:
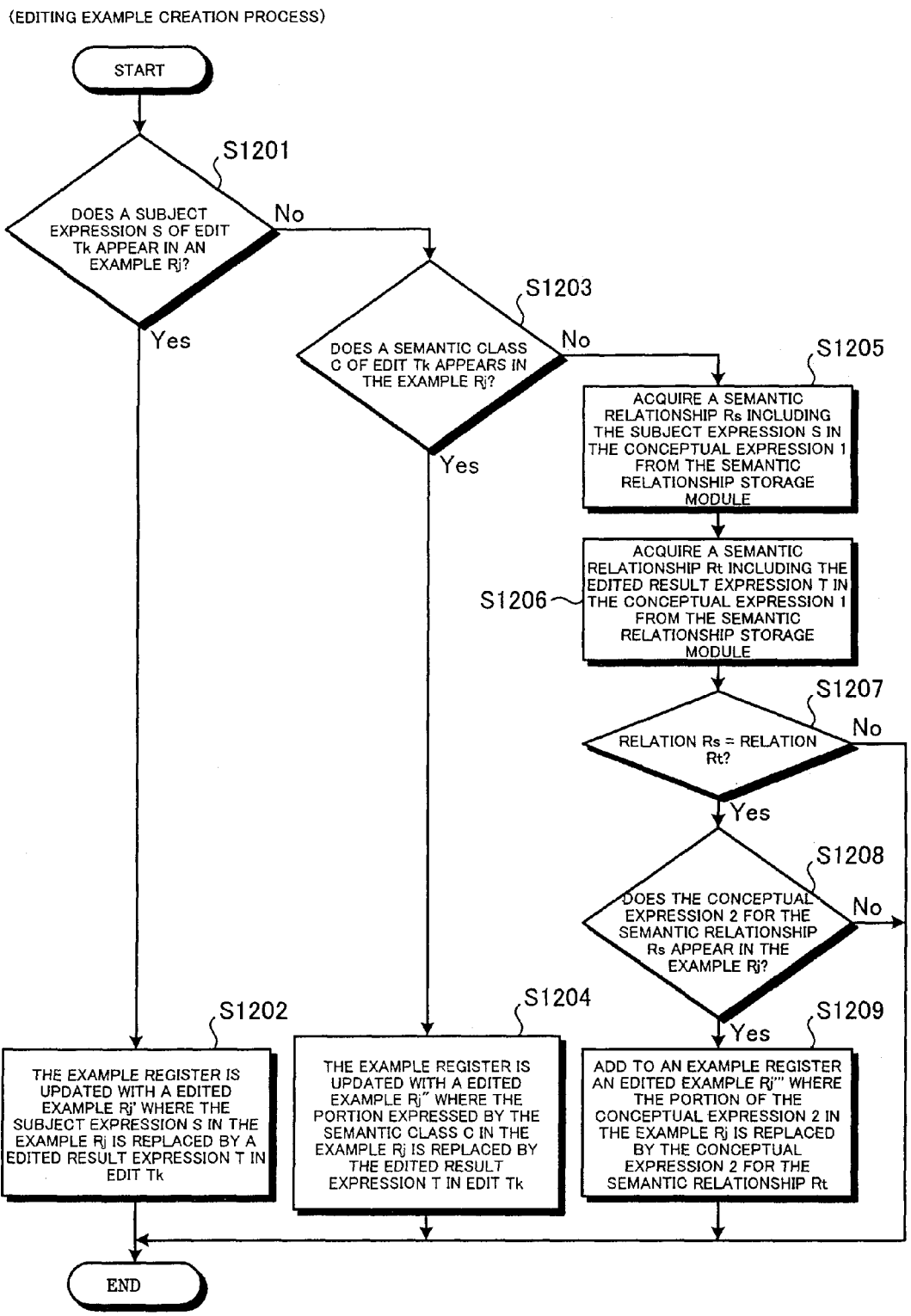
FIG. 12 shows a flow chart depicting the overall flow of an edited example creation process according to the second embodiment.

FIG. 12 shows a flow chart depicting the overall flow of the edited example creation process according to the second embodiment.

The editing processes from Step S1201 to Step S1204 for the first method and the second method are the same as the processes from Step S601 to Step S604 in the speech translation apparatus 100 according to the first embodiment, and the explanation is omitted.

If the semantic class C of edit Tk does not appear in an example translation Rj at Step S1203 (Step S1203: NO), the edit adapting module 1003 acquires the semantic relationship including a subject expression S of edit Tk as conceptual expression 1 (hereinafter, referred to as a semantic relationship Rs) from the semantic relationship storage module 1015 (Step S1205).

Subsequently, the edit adapting module 1003 acquires the semantic relationship that has an edited result expression T for edit Tk as conceptual expression 1 (hereinafter, a semantic relationship Rt) from the semantic relationship storage module 1015 (Step S1206).

Subsequently, the edit adapting module 1003 determines whether the relationship column for the acquired semantic relationship Rs matches the relationship column for the semantic relationship Rt (Step S1207). When there is no match, (Step S1207: NO), the edited example creation process is ended.

When the relationship column for the acquired semantic relationship Rs matches the relationship column for the semantic relationship Rt (Step S1207: YES), the edit adapting module 1003 determines whether the conceptual expression 2 for the semantic relationship Rs appears in the example Rj (Step S1208).

When the conceptual expression 2 for the semantic relationship Rs appears in the example Rj (Step S1208: YES), the edit adapting module 1003 adds to the example register an edited example translation Rj''' by replacing the conceptual expression 2 in the example Rj with the conceptual expression 2 for the semantic relationship Rt (Step S1209).

When the conceptual expression 2 for the semantic relationship Rs does not appear in the example Rj (Step S1208: NO), the edited example creation process is ended.

Next, a specific example of the speech translation process executed in accordance with the procedures described above will be described. FIG. 13 is an illustration depicting exemplary data items processed in the speech translation process.

Here, the premise is that the translation shown in (f1) in FIG. 13 is output by procedures similar to those described in FIG. 9 in the first embodiment. In addition, the semantic relationship storage module 1015 is considered to store the semantic relationships as shown in FIG. 11.

Suppose a user changes the use condition to "sightseeing" (Step S406). Then, to present an example corresponding to the changed use condition, the presentation example creation process is performed (Step S402). In this case, for the example having the related situation "SIGHTSEEING" in the situation column, example ID's q06 and q07 are acquired from the example storage module 111 (Step S502).

In (g1) and (g2) in FIG. 13, the acquired examples are shown. In addition, the edit for edit ID=r01 is acquired from the edit storage module 112 (Step S503).

For example ID=q06, the words "New York (in Japanese)" are the subject expression of the acquired edit, but do not appear in the example translation (Step S1201: NO), and the semantic class of the edit, "#CITY", does not appear in the example translation (Step S1203: NO). Thus an editing process is performed by referring to the semantic relationship storage module 1015.

The words "New York (in Japanese)" are the subject expression. The semantic relationship with the subject expression in the conceptual expression 1 column is acquired from the semantic relationship storage module 1015, in this case the semantic relationship corresponding to knowledge ID =s01 (Step S1205). The words "Los Angeles (in Japanese)" are the edited result expression. The semantic relationships with the edited result expression in the conceptual expression 1 column are subsequently acquired from the semantic relationship storage module 1015, in this case the semantic relationships with knowledge ID's=s04, s05, and s06.

The relationship column for the semantic relationship with knowledge ID=s01 matches the relationship column for each knowledge ID=s04, s05, and s06 (Step S1207: YES). Next it is determined whether the conceptual expression 2 for the knowledge ID=s01, i.e. the words "Empire State Building (in Japanese)," appear in example ID=q06 (Step S1208).

Example ID=q06 includes the sentence "Where is the Empire State Building? (in Japanese)", which in turn includes the words "Empire State Building (in Japanese)," i.e., the conceptual expression 2 for knowledge ID=s01 (Step S1208: YES). Thus, three example expressions are added to the example register by replacing the conceptual expression for knowledge ID=s01 with the conceptual expression 2 for each of knowledge ID's =s04, s05, and s06, respectively (Step S1209).

In contrast, example ID=q07 is not edited, and the source example is output as is. Consequently, the examples shown in (h1) to (h4) in FIG. 13 are added in the example register.

When the same example translation is edited to present a plurality of edited results, a single presentation example may be presented so that the user may select only the edited portion from a plurality of candidates as shown in (i1) in FIG. 13.

Thus, even when a user selects the use condition "sightseeing" for the first time, presentation examples that are highly likely to be selected by the user can be created and presented to the user. Thus, user efforts to operate the apparatus can be reduced.

In addition, the example expressions shown in (h1) to (h3) in FIG. 13 can be stored beforehand in the example storage module 111, and suitably edited and presented to the user. Even for an expression with a semantic class that a user has never used before, in this case "#POI," the example expression can be suitably edited and presented to the user.

As described above, in the speech translation apparatus according to the second embodiment, the semantic relationship between two expressions can be used to edit an example expression, and the example expression can be presented to the user. Therefore, it is unnecessary to exhaustively prepare example translations or expressions for various user attributes such as gender, age, occupation, and travel experiences. Instead, the example expressions and translations can be edited by matching them with the attributes of the user to whom they will be presented. Therefore, the number of edits to the presentation examples are reduced, with a corresponding reduction in user effort.

The input program operating in the input apparatus according to the first and second embodiments can be installed in a ROM (Read Only Memory).

The input program operating in the input apparatus according to the first and second embodiments may be configured to be recorded and offered in a file in a format suitable for a computer readable recording medium such as a CD-ROM (Compact Disk Read Only Memory), a flexible disk (FD), a CD-R (Compact Disk Recordable), or a DVD (Digital versatile Disk).

In addition, the input program operating in the input apparatus according to the first and second embodiments may be configured by storing the program in a computer connected to a network such as the Internet, and downloaded through the network. Further, the input program operating in the input apparatus according to the first and second embodiments may be offered or distributed through a network such as the Internet.

The input program operating in the input apparatus according to the first and second embodiments can be configured with the modules described above (the use condition detecting module, the presentation example determining module, the edit adapting module, the display control module, the example selection accepting module, the speech input accepting module, the analyzing module, and the translation and output module). A CPU (Central Processing Unit) can read the input program out of the ROM and run the program to load one or more of the modules a main storage, and the individual modules can thus be created on the main storage.

As described above, the input apparatus, the input method and input program according to embodiments of the invention are suitable for the input apparatus which presents examples and specifies a suited entry description from the presented examples.

What is claimed is:

1. An expression selection and modification apparatus including a processor comprising:
    a memory that contains a plurality of pre-stored multi-word example expressions, each example expression including at least one editable portion, said example expressions being stored in said memory prior to a current use of said apparatus by a user;
    a deciding module configured to select one of said pre-stored example expressions to be presented to the user from among the pre-stored example expressions based on the current use being made of the apparatus determined by a physical activity association with the current location, but not the language spoken at that location, as a presentation example expression;
    an editing storage module configured to store, upon the edit by the user to the editable portion of one of the example expressions, words of the one of the example expression before the edit and words thereof after the edit;
    an editing adapting module configured to adjust the presentation example expression by replacing the words of the presentation example expression before the edit with the words thereof after the edit;
    a display control module configured to present the presentation example expression adjusted by the edition adaptation module; and
    an entry accepting module configured to provide the option to:
        accept the unedited presentation example expression for further processing upon a selection of it by the user; or
        accept the edited presentation example expression for further processing upon the edit of it by the user.

2. The apparatus of claim 1, wherein said expressions are speech expressions.

3. The apparatus according to claim 1, wherein the editing storage module includes an association of a wording of the portion to be edited in the presentation example before editing with the user edit of that portion, and of the portion to be edited in the presentation example by said associated user edit;
    the editing adapting module permits editing of an example of expression stored in said example storage module including the wording of the portion to be edited by replacing that wording with the associated user edit.

4. The apparatus according to claim 1, wherein the memory includes an association of a semantic attribute expressing a meaning of a user edit with that user edit, and with the wording of the portion to be edited in the presentation example by said associated user edit; and
    the editing adapting module permits editing of presentation examples that have wording given the same semantic attribute as the semantic attribute of the portion to be edited in an edited presentation example, by replacing that wording with the associated user edit.

5. The apparatus according to claim 4, further comprising a semantic relation storage module which associates a plurality of wordings with a semantic relation between the plurality of the wordings, of the portion to be edited in the presentation example by said associated user edit;
    wherein the editing adapting module permits editing of wording of an example of expression from the semantic relation storage module, by acquiring a wording having the same semantic relation as the acquired semantic relation for the wording after editing from the semantic relation storage module, and by editing said example of expression by replacing the wording having the semantic relation acquired for the wording before editing with the wording having the semantic relation acquired for the wording after editing.

6. The apparatus according to claim 1, further comprising an analyzing module which, when the entry accepting module accepts an entry having a description that a user partially edits in a presentation example, specifies the edited portion and registers an indication that a wording before editing is associated with a wording after editing in the editing storage module.

7. The apparatus according to claim 1, wherein the input apparatus further includes a use detecting module and wherein the display control module presents possible current uses;
    the entry accepting module accepts an entry of a use selected by the user from the uses displayed by the display control module; and
    the use detecting module detects the use accepted by the entry accepting module as the current use.

8. The apparatus according to claim 1, further comprising a location information acquiring module which acquires information about a location of the input apparatus, including a use detecting module that permits detection of the current use based on information about a location acquired by the location information acquiring module.

9. The apparatus according to claim 1, wherein the entry accepting module, upon receipt of speech input, applies the accepted speech input to speech recognition to determine if that speech input describes a displayed presentation example, either wholly or partially.

10. An input method for use with an input apparatus comprising:
    storing a plurality of multi-word example expressions in an electronic medium, each example expression including at least one editable portion, said example expressions being stored in said electronic medium prior to a current use of said apparatus by a user;
    electronically selecting at least one of said example expressions from the examples stored in the example storage module to be presented to a user of the input apparatus as a presentation example based on the current use being made of the apparatus as determined by a physical activity association with the current location, but not the language spoken at that location;
    electronically displaying said at least one presentation example;
    electronically editing at least the editable portion of the at least one of the displayed presentation examples based on user input;
    electronically storing words of the one of the example expression before the edit and words thereof after the edit; and exercising the option of selecting between:
  accepting the unedited presentation example expression for further processing upon a selection of it by the user; or
  accepting the edited presentation example expression for further processing upon the edit of it by the user.

11. The method of claim 10 wherein said expressions are speech expressions.

12. The method of claim 10, including:
associating a wording of the portion to be edited in the presentation example before editing with the user edit of that portion; and
editing an example of expression stored in said example storage module including the wording of the portion to be edited by replacing that wording with the associated user edit.

13. The method of claim 10, including:
electronically associating a semantic attribute expressing a meaning of a user edit with that user edit, and with the wording of the portion to be edited in the presentation example by said associated user edit; and
electronically editing presentation examples that have wording given the same semantic attribute as the semantic attribute of the portion to be edited in an edited presentation example, by replacing that wording with the associated user edit.

14. The method of claim 13 further comprising:
associating a plurality of wordings with a semantic relation between the plurality of the wordings; and
editing of wording of an example of expression by acquiring a semantic relation associated with the wording before editing, by acquiring a wording having the same semantic relation as the acquired semantic relation for the wording after, and by editing said example of expression by electronically replacing the wording having the semantic relation acquired for the wording before editing with the wording having the semantic relation acquired for the wording after editing.

15. The method of claim 10 further comprising:
identifying when a user partially edits a presentation example;
specifying the edited portion; and
electronically registering an indication that a wording before editing is associated with a wording after editing.

16. The method of claim 10, further comprising:
electronically displaying possible current uses; and
selecting, by input from a user, one of the displayed possible current uses as the current use.

17. The method of claim 10, further comprising:
using a location information acquiring module to acquire information about a location of the input apparatus; and
determining the current use of the input apparatus based on information about a location acquired by the location information acquiring module.

18. The method of claim 10, further comprising:
using a speech recognition apparatus to determine if speech input describes a displayed presentation example, either wholly or partially; and
if said speech input only partially describes a displayed presentation example, editing said example to conform with said speech input.

19. A computer-readable medium comprising program instructions, which, when executed by an input apparatus, cause said input apparatus to perform the steps of:
storing a plurality of multi-word example expressions in an electronic medium, each example expression including at least one editable portion, said example expressions being stored in said electronic medium prior to a current use of said apparatus by a user;
selecting at least one of said examples of expressions from the examples stored in the example storage module to be presented to a user of the input apparatus as a presentation example based on the current use being made of the apparatus as determined by a physical activity association with the current location, but not the language spoken at that location;
displaying said at least one presentation example;
editing at least the editable portion of the at least one of the displayed presentation examples based on user input;
electronically storing words of the one of the example expression before the edit and words thereof after the edit; and
exercising the option of selecting between:
  accepting the unedited presentation example expression for further processing upon a selection of it by the user; or
  accepting the edited presentation example expression for further processing upon the edit of it by the user.

20. The computer-readable medium of claim 19 wherein said expressions are speech expressions.

21. The computer-readable medium of claim 19 further comprising program instructions, which, when executed by the input apparatus, cause said input apparatus to perform the steps of:
associating a wording of the portion to be edited in the presentation example before editing with the user edit of that portion; and
editing an example of expression stored in said example storage module including the wording of the portion to be edited by replacing that wording with the associated user edit.

22. The computer-readable medium of claim 19 further comprising program instructions, which, when executed by the input apparatus, cause said input apparatus to perform the steps of:
associating a semantic attribute expressing a meaning of a user edit with that user edit, and with the wording of the portion to be edited in the presentation example by said associated user edit; and
editing presentation examples that have wording given the same semantic attribute as the semantic attribute of the portion to be edited in an edited presentation example, by replacing that wording with the associated user edit.

23. The computer-readable medium of claim 22 further comprising program instructions, which, when executed by the input apparatus, cause said input apparatus to perform the steps of:
associating a plurality of wordings with a semantic relation between the plurality of the wordings; and
editing of wording of an example of expression by acquiring a semantic relation associated with the wording before editing, by acquiring a wording having the same semantic relation as the acquired semantic relation for the wording after, and by editing said example of expression by electronically replacing the wording having the semantic relation acquired for the wording before editing with the wording having the semantic relation acquired for the wording after editing.

24. The computer-readable medium of claim 19 further comprising program instructions, which, when executed by the input apparatus, cause said input apparatus to perform the steps of:
identifying when a user partially edits a presentation example;

specifying the edited portion; and electronically registering an indication that a wording before editing is associated with a wording after editing.

25. The computer-readable medium of claim 19 further comprising program instructions, which, when executed by the input apparatus, cause said input apparatus to perform the steps of:

using a location information acquiring module to acquire information about a location of the input apparatus; and determining the current use of the input apparatus based on information about a location acquired by the location information acquiring module.

26. The computer-readable medium of claim 19 further comprising program instructions, which, when executed by the input apparatus, cause said input apparatus to perform the steps of:

using a speech recognition apparatus to determine if speech input describes a displayed presentation example, either wholly or partially; and if said speech input only partially describes a displayed presentation example, editing said example to conform with said speech input.

27. The computer-readable medium of claim 19, further comprising program instructions, which, when executed by the input apparatus, cause said input apparatus to perform the steps of:

electronically displaying possible current uses; and selecting, by input from the user, one of the displayed possible current uses as the current use.

* * * * *